United States Patent
Zhang et al.

(10) Patent No.: US 9,948,024 B1
(45) Date of Patent: Apr. 17, 2018

(54) PROTECTING CAP STRUCTURE OF CHARGING GUN

(71) Applicant: JIANGYIN SINBON ELECTRONICS CO., LTD., Jiangyin, Jiangsu (CN)

(72) Inventors: Xue-Feng Zhang, Jiangsu (CN); Jian Zhou, Jiangsu (CN); Wen-Jie Li, Jiangsu (CN)

(73) Assignee: JIANGYIN SINBON ELECTRONICS CO., LTD., Jiangyin (CN)

( * ) Notice: Subject to any disclaimer, the term of this patent is extended or adjusted under 35 U.S.C. 154(b) by 0 days.

(21) Appl. No.: 15/666,213

(22) Filed: Aug. 1, 2017

(30) Foreign Application Priority Data

Mar. 13, 2017 (CN) .................... 2017 2 0241045 U

(51) Int. Cl.
*H01R 13/447* (2006.01)
*H01R 13/502* (2006.01)
*H01R 13/52* (2006.01)
*B60L 11/18* (2006.01)

(52) U.S. Cl.
CPC ...... *H01R 13/5213* (2013.01); *B60L 11/1816* (2013.01); *H01R 13/447* (2013.01); *H01R 13/5025* (2013.01); *B60L 2230/10* (2013.01); *H01R 2201/26* (2013.01)

(58) Field of Classification Search
CPC ............ H01R 13/5025; H01R 13/5213; H01R 2201/26; H01R 13/447; B60L 2230/10
See application file for complete search history.

(56) References Cited

U.S. PATENT DOCUMENTS

| | | | | |
|---|---|---|---|---|
| 3,112,975 A | * | 12/1963 | Hamel ............... | H01R 13/5219 439/321 |
| 3,129,993 A | * | 4/1964 | Ross ..................... | H01R 13/64 439/294 |
| 3,271,726 A | * | 9/1966 | Pfendler ............... | H01R 24/84 439/76.1 |
| 3,393,824 A | * | 7/1968 | Appleton ............. | H01R 13/447 220/288 |
| 3,633,150 A | * | 1/1972 | Swartz ............... | H01R 13/5221 439/135 |
| 4,381,879 A | * | 5/1983 | Ehrenfels ............. | H01R 13/447 439/142 |
| 5,800,188 A | * | 9/1998 | Barber ..................... | B60D 1/64 220/242 |

(Continued)

Primary Examiner — James Harvey
Assistant Examiner — Oscar Jimenez
(74) Attorney, Agent, or Firm — Rabin & Berdo, P.C.

(57) ABSTRACT

A protecting cap structure of a charging gun has a cover, a push plate, a fixing seat, at least one first resilient element, and a gland. The push plate is moveably mounted in a containing groove of the cover. The fixing seat, the first resilient element, and the gland are mounted in the containing groove. The first resilient element and the gland are respectively mounted on both sides of the push plate, and the first resilient element abuts and pushes the front side of the push plate. The protecting cap structure not only improves water resistance and dust resistance by the gland which is propped by the resilient element when the cover covers the plug of the charging gun, but also is easy to use because the resilient elements push forward the cover when the cover is to be removed.

18 Claims, 12 Drawing Sheets

(56) References Cited

U.S. PATENT DOCUMENTS

| | | | | |
|---|---|---|---|---|
| 5,951,309 | A * | 9/1999 | Hopper | H01R 13/447 439/136 |
| 6,142,805 | A * | 11/2000 | Gray | H01R 13/5213 439/135 |
| 6,558,167 | B2 * | 5/2003 | Harmon | B60D 1/62 439/35 |
| 6,676,422 | B1 * | 1/2004 | Baker | H01R 13/447 439/135 |
| 7,341,464 | B2 * | 3/2008 | Cuellar | H01R 13/447 439/135 |
| 7,438,589 | B1 * | 10/2008 | Fleury | H01R 25/006 439/34 |
| 7,648,384 | B2 * | 1/2010 | Desissard | H01R 13/5213 174/67 |
| 7,972,154 | B2 * | 7/2011 | Pech | H01R 13/625 439/173 |
| 8,455,759 | B2 * | 6/2013 | Mortun | H01R 13/447 174/50 |
| 8,506,315 | B2 * | 8/2013 | Canedo | H01R 13/60 439/310 |
| 8,747,129 | B2 * | 6/2014 | Ichio | B60L 11/1818 439/135 |

\* cited by examiner a # PROTECTING CAP STRUCTURE OF CHARGING GUN

BACKGROUND OF THE INVENTION

1. Field of the Invention

The present invention relates to a protecting cap structure, especially a protecting cap structure of a charging gun for use on an electric vehicle.

2. Description of the Prior Arts

Energy saving and emission reduction have received ever-increasing attentions with the impact on the earth's atmosphere caused by carbon dioxide emissions leading to greenhouse effect and other abnormal climate changes. Reducing the carbon dioxide emissions in order to ameliorate effects of climate change has especially become the primary policy for every government all over the world and is strongly advocated by the governments. Therefore the automobile manufacturers have developed the electric vehicles that are making vehicles cleaner, more fuel-efficient and reduce the carbon dioxide emissions for responding to the governmental policy. The electric vehicles have become one of the top choices of the drivers for reducing the consumption of the fuel.

Since the electric vehicles switch from oil to electricity, they need to be recharged via a charging gun. As shown in FIG. 12, a conventional charging gun 91 has a plug 911 in the anterior part of the charging gun 91, and a protecting cap 92 covers on the plug 911 for dust and water resistance. The protecting cap 92 is compatible with or smaller than the form factor of the plug 911. However, the protecting cap 92 is normally made by rubber, and due to the heat generated by repeated insertion and extraction, the protecting cap 92 may be degraded after that. Thus the plug 911 may be damaged by dust and water. Besides, it is not convenient to remove the protecting cap 92 which is compatible with or smaller than the form factor of the plug 911, and the protecting cap 92 may even be broken down by excessive force.

SUMMARY OF THE INVENTION

As the conventional protecting cap is not convenient for removal and is prone to degradation due to repeated insertion, the present invention provides a protecting cap structure of a charging gun, and the protecting cap structure comprises a cover, a push plate, a fixing seat, at least one first resilient element, and a gland. The cover has a front side, a back side, and a containing groove formed in the back side of the cover. The push plate is moveably mounted in the containing groove and has a front side and a back side. The fixing seat is mounted in the containing groove, is disposed in front of the push plate, and has a front side and a back side. The at least one first resilient element is mounted in the containing groove, is mounted on the fixing seat, and pushes backward the push plate. The gland is mounted in the containing groove and is mounted on the back side of the push plate.

The provided structure not only improves water resistance and dust resistance by the gland which is propped by the resilient element when the cover covers the plug of the charging gun, but also is easy to use due to the resilient elements pushing forward the cover when the cover is to be removed.

DETAILED DESCRIPTION OF THE INVENTION

Figure 1:
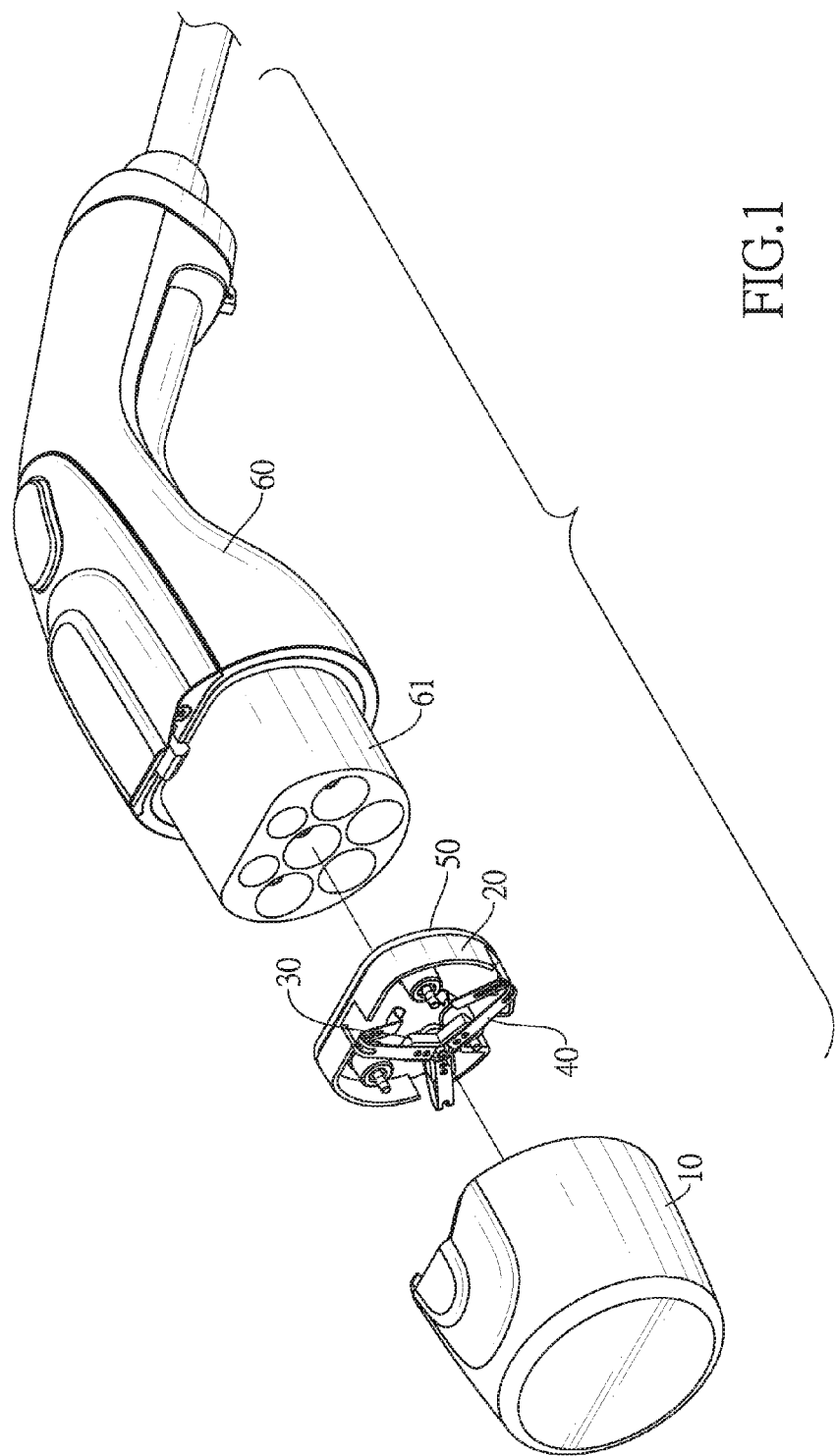
FIG. 1 is a perspective view of a first embodiment of a protecting cap structure in accordance with the present invention, shown mounted with a charging gun.
Figure 2:
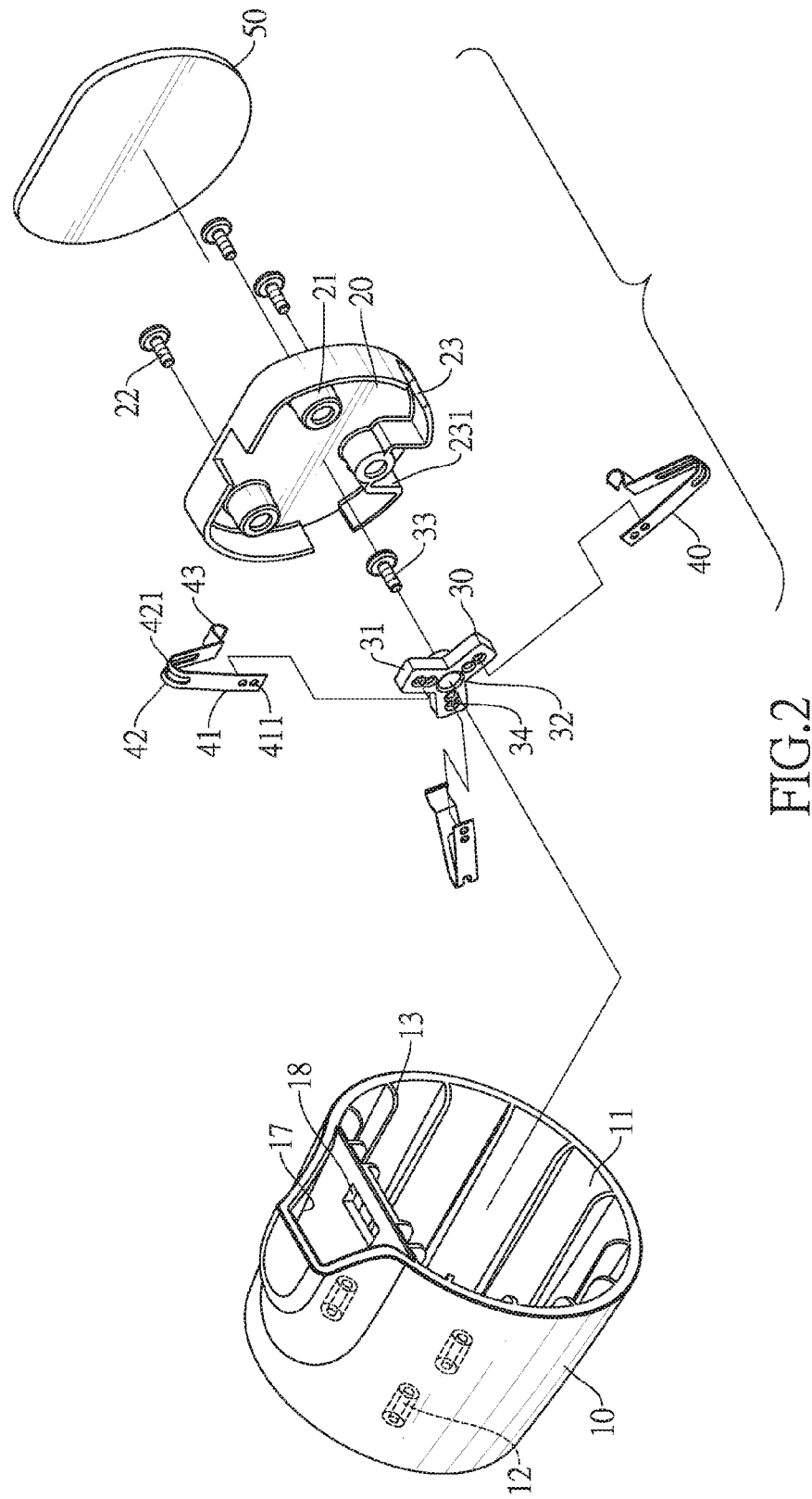
FIG. 2 is an exploded perspective view of the protecting cap structure in FIG. 1.

As shown in FIGS. 1 and 2, a first embodiment of a protecting cap structure of a charging gun 60 comprises a cover 10, a push plate 20, a fixing seat 30, a gland 50 and at least one first resilient element 40. In this preferred embodiment the optimized amount of the at least one first resilient element 40 is three.

The charging gun 60 has a plug 61 in the front thereof, and an electric vehicle can be recharged by the charging gun 60 via the plug 61.

Figure 3:
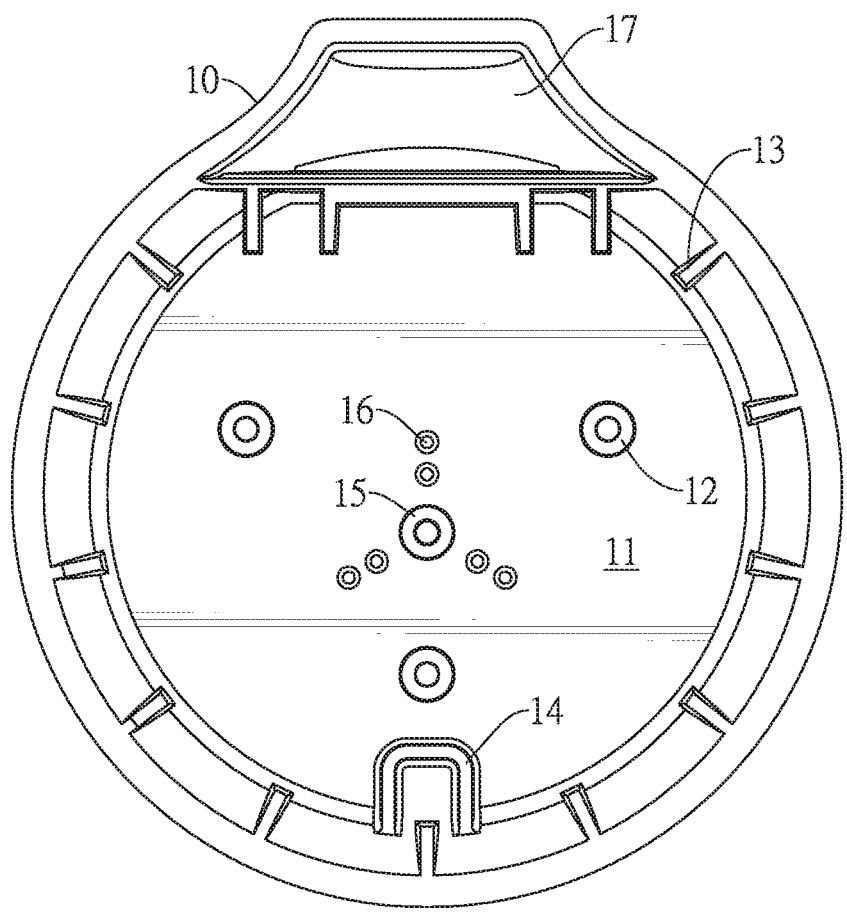
FIG. 3 is a rear view of a cover of the protecting cap structure in FIG. 1.

With reference to FIGS. 2 and 3, the detailed structure of the cover 10 is illustrated. The cover 10 has a front side and a back side. A containing groove 11 is formed from the back side to the front side of the cover 10.

The push plate 20 is moveably mounted in the containing groove 11 and has a front side and a back side.

In this preferred embodiment, multiple first joints 21 are formed on the push plate 20, while multiple second joints 12, matching with and connected to the first joints 21, are further formed on the back side of the cover 10. To be more specific, each first joint 21 is a punch hole formed in the back side of the push plate 20, and each first joint 21 has a stepped side wall. The second joints 12 are mounted in the first joints 21, and each second joint 12 has a screw hole. Multiple first fixing elements 22 are mounted through the first joints 21 and are screwed in the second joints 12 to fix the push plate 20 on the cover 10. The push plate 20 is moveable relative to the first fixing elements 22, and the first fixing elements 22 selectively abut the stepped side walls of the first joints 21 to prevent the push plate 20 from separating from the cover 10.

In this preferred embodiment, a surrounding wall 23 is formed on the front side of the push plate 20 and is formed around a periphery of the push plate 20. Multiple ribs 13 are mounted at spaced intervals on an inner surface of the containing groove 11 of the cover 10. The ribs 13 prop the surrounding wall 23 of the push plate 20 so that the push plate 20 can easily move forward and backward in the containing groove 11.

In this preferred embodiment, a positioning groove 231 is further formed in the surrounding wall 23 of the push plate 20. A positioning part 14, correspondingly disposed in the positioning groove 231, is formed on the back side of the cover 10 so that the push plate 20 is precisely set in the containing groove 11.

Figure 4:
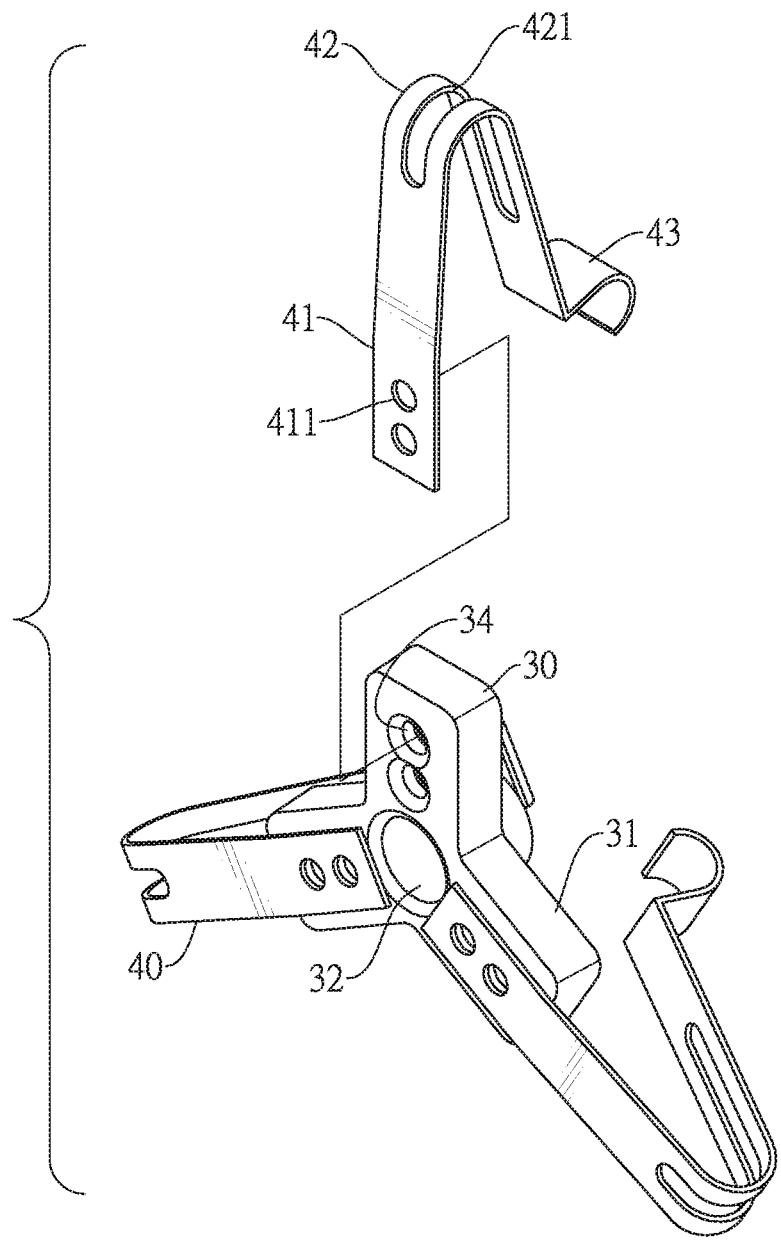
FIG. 4 is a perspective view of a fixing seat and three first resilient elements of the protecting cap structure in FIG. 1.
Figure 5:
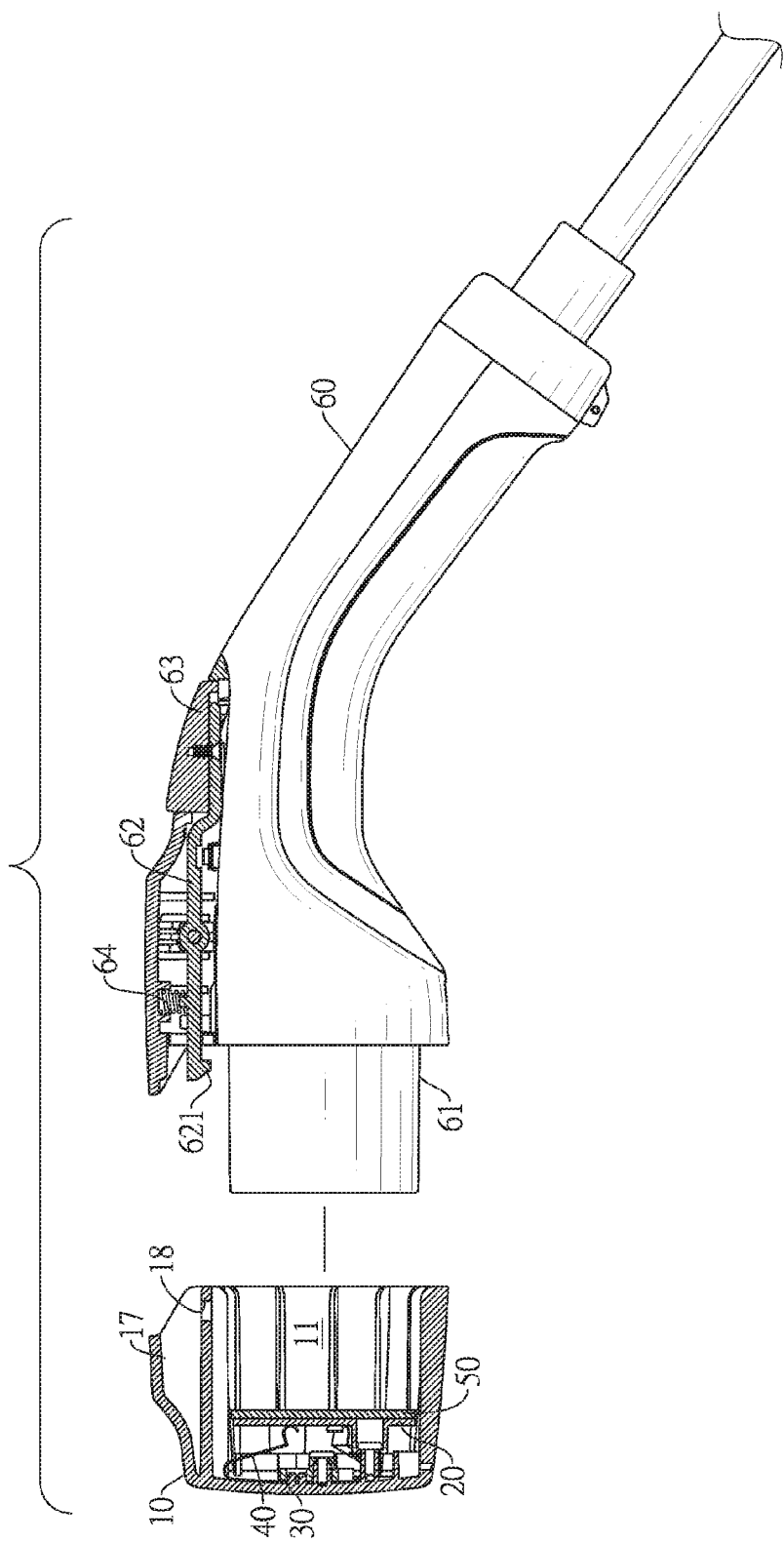
FIGS. 5 and 6 are side views in partial section of the protecting cap structure with the charging gun in FIG. 1.

As shown in FIGS. 2 and 4, the fixing seat 30 is mounted in the containing groove 11, and is disposed in front of the push plate 20. A periphery of the fixing seat 30 extends into at least one extending part 31 which is connected to the first resilient elements 40. In this preferred embodiment, there are three extending parts 31 formed at spaced intervals corresponding to the first resilient elements 40.

With reference to FIGS. 2 and 3, the detailed structure of the connection between the cover 10 and the fixing seat 30 is illustrated. A third joint 32 is formed on the fixing seat 30 while a fourth joint 15 is further formed on the back side of the cover 10. The fourth joint 15 is located among the second joints 12 in order to mount the fixing seat 30 in the middle position. The fourth joint 15 is connected to and corresponds to the third joint 32. In this preferred embodiment, the third joint 32 is a punch hole and the fourth joint 15 is a screw hole. A second fixing element 33 is mounted through the third joint 32 and is screwed in the fourth joint 15 to fix the fixing seat 30 on the cover 10.

The first resilient elements 40 are mounted in the containing groove 11, are mounted on the extending parts 31 of the fixing seat 30, and push backward the push plate 20. As shown in FIGS. 2 and 4, each first resilient element 40 has a horizontal part 41 having a first end and a second end. The first end is connected to the corresponding extending part 31 of the fixing seat 30, while the second end has a U-shaped bending part 42 to provide elasticity for the first resilient elements 40. One end of the bending part 42 extends and bends into an abutting part 43 to abut the front side of the push plate 20.

In this preferred embodiment, an elongated hole 421 is formed through the bending part 42 to make the bending part 42 easy to bend in order to provide elasticity for the first resilient elements 40.

In this preferred embodiment, multiple fifth joints 34 are separately formed on the extending parts 31 of the fixing seat 30. Multiple sixth joints 411 are formed on the first end of the horizontal part 41 corresponding to the fifth joints 34.

With reference to FIGS. 2, 3, 7 and 8, the detailed structure of the connection among the first resilient elements 40, the cover 10 and the fixing seat 30 is illustrated. Multiple seventh joints 16 are formed at spaced intervals on the back side of the cover 10 connected to and corresponding to the fifth joints 34 and the sixth joints 411. The seventh joints 16 are mounted through the fifth joints 34 and the sixth joints 411 to fix the fixing seat 30 and the first resilient elements 40 between the push plate 20 and the back side of the cover 10.

The gland 50 is mounted in the containing groove 11 and is mounted on the back side of the push plate 20. In this preferred embodiment, the gland 50 is made of rubber with characteristics of water resistance and dust resistance.

Figure 6:
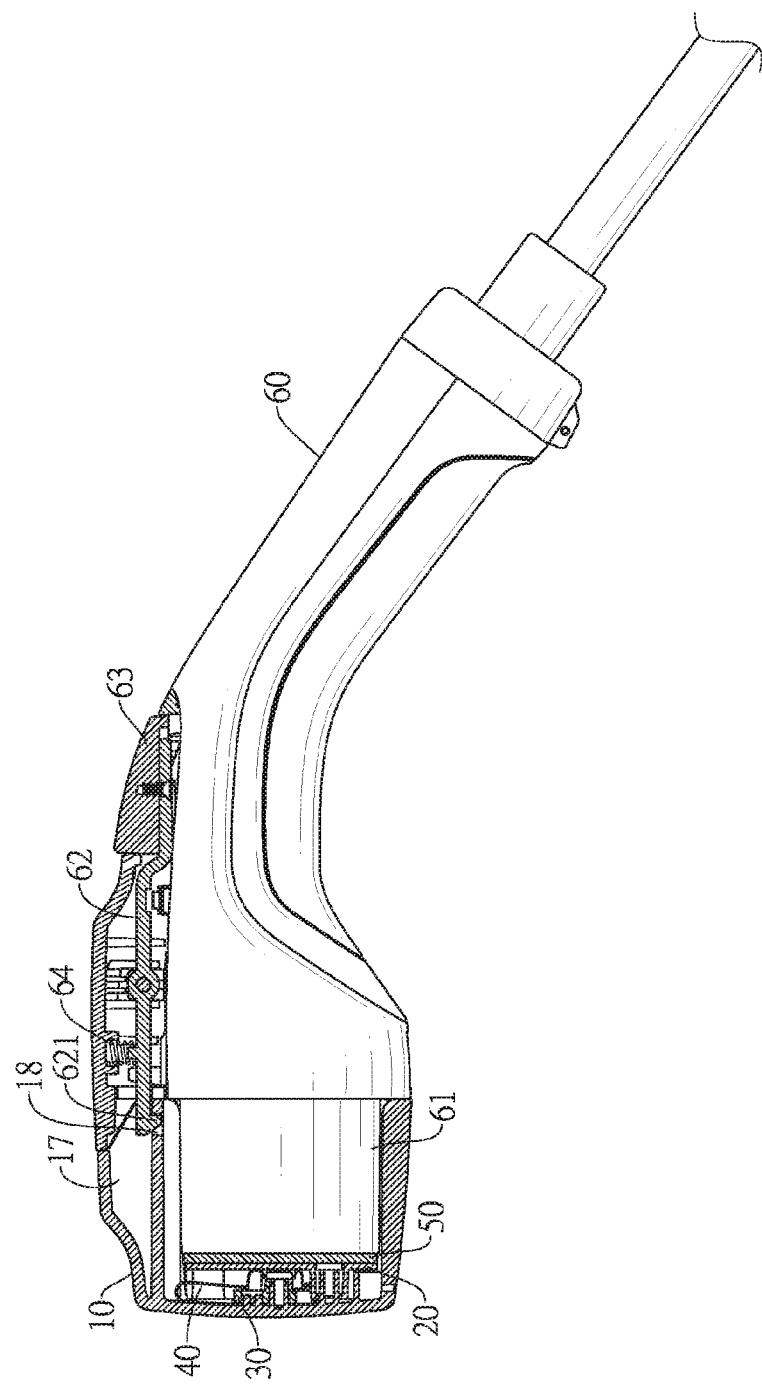
Figure 7:
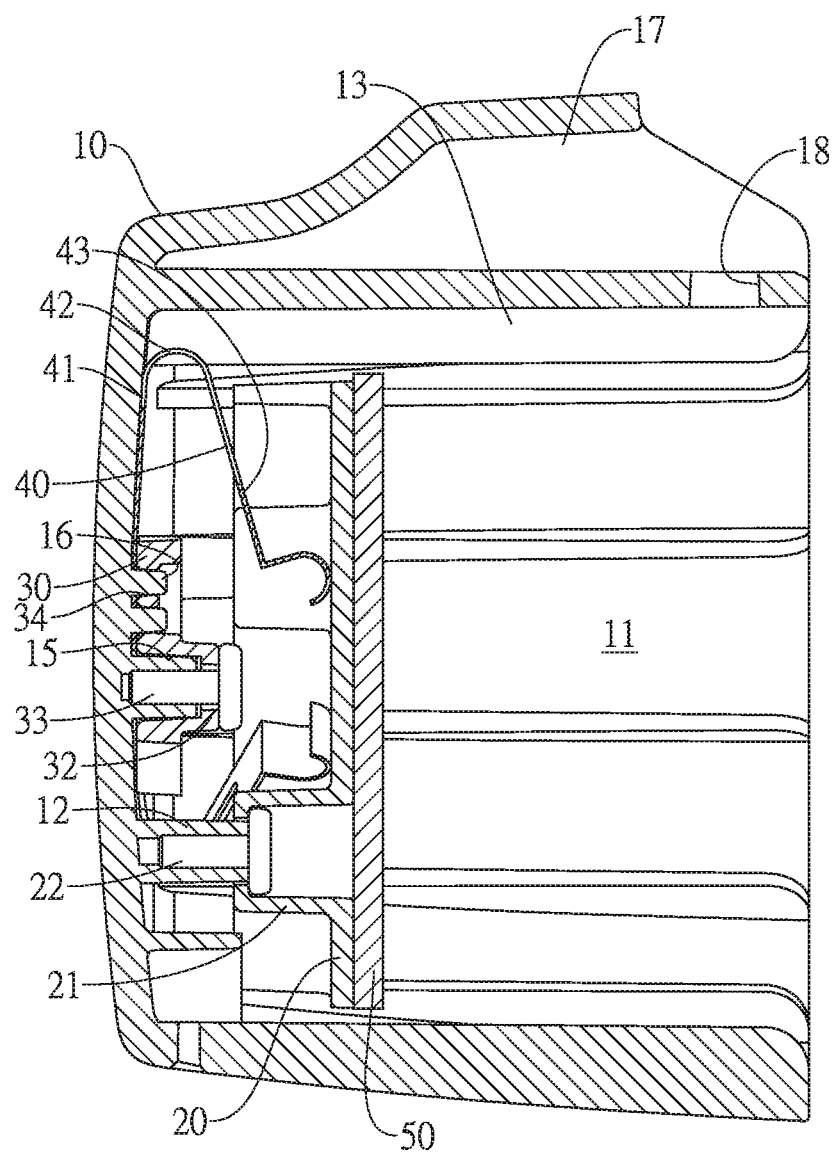
FIGS. 7 and 8 are enlarged views of FIGS. 5 and 6 respectively.
Figure 8:
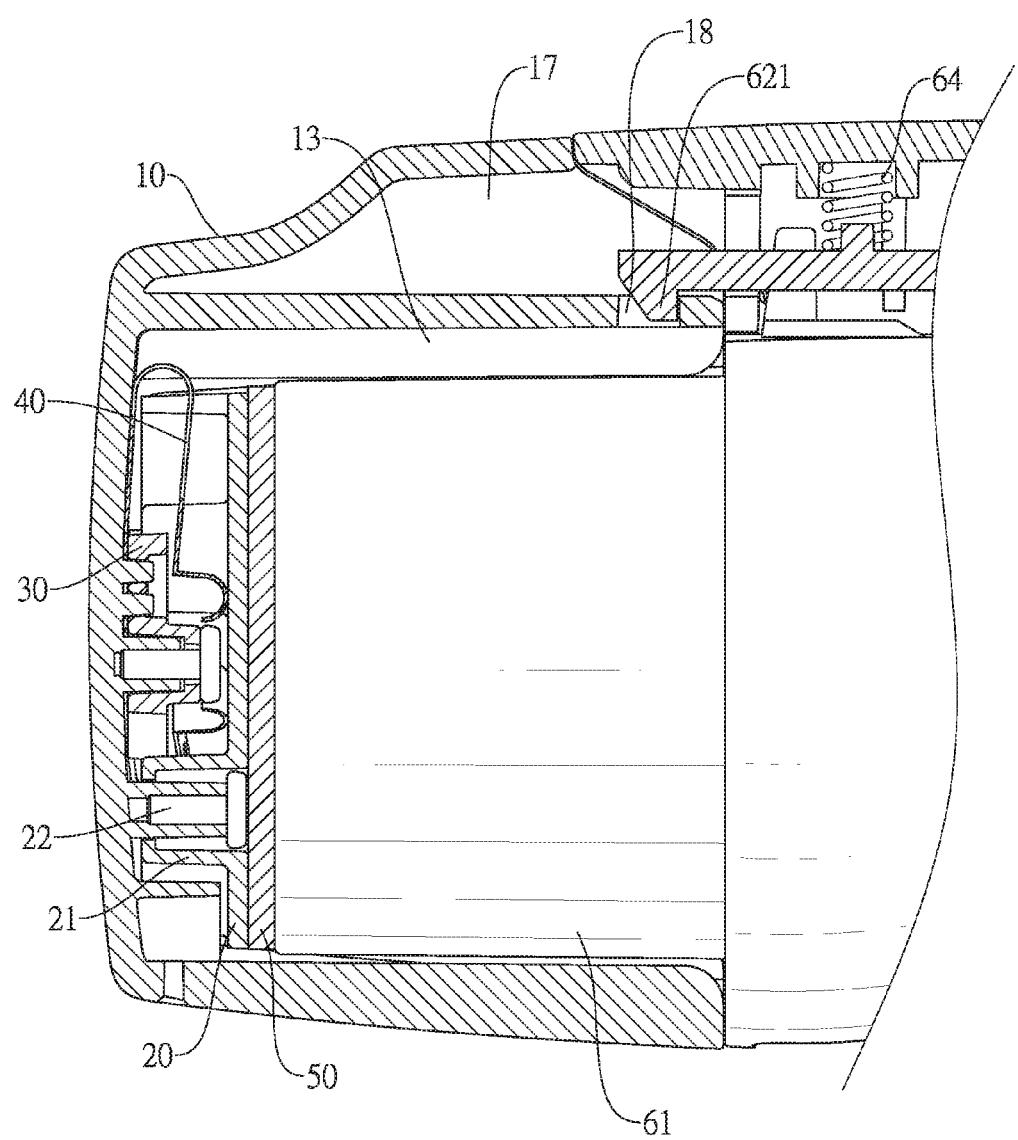

With reference to FIGS. 6 to 8, the detailed structure of the connection between the cover 10 and the charging gun 60 is illustrated. A joint groove 17 is formed on the top of the cover 10 and an opening 18 is formed on the cover 10 corresponding to a side wall of the joint groove 17. A latch 62 is formed on the charging gun 60 with a clamping part 621 in the front. The clamping part 621 correspondingly clamps an interior of the opening 18 of the joint groove 17. There is a second resilient element 64 in the front of the latch 62 and a button 63 in the back of the latch 62. With the button 63 is pushed, the front of the latch 62 is pushed to release or clamp the interior the opening 18. The second resilient element 64 pushes the clamping part 621 to clamp the interior of the opening 18 to secure the connection between the cover and the charging gun 60.

FIGS. 5 to 8 show the detailed structure of the connection among the push plate 20, the first resilient element 40 and the gland 50 when the cover 10 is covered on or removed from the plug 61 of the charging gun 60.

To remove the cover 10 from the charging gun 60, the clamping part 621 is released from the opening 18 by the button 63 while the first resilient element 40 pushes the push plate 20 to move forward the cover 10, making the cover 10 easy to be removed.

When the cover 10 is covered on the plug 61, the plug 61 is precisely and easily plugged into the cover 10 by the ribs 13 of the containing groove 11. The front of the plug 61 abuts the gland 50 and pushes the push plate 20 and the first resilient element 40 to move forward, and thus the clamping part 621 clamps the interior of the opening 18 so that the cover 10 is covered on the plug 61. While the push plate 20 is pushed by the first resilient element 40, the gland 50 is tightly abutted by the push plate 20 in the front side of the plug 61 to protect the plug 61 from water and dust.

The present invention enhances both the protective function and ease in use. The push plate 20 of the protecting cap structure is pushed by the first resilient element 40 and the push plate 20 tightly abuts and pushes the gland 50 on the front side of the plug 61 to enhance water resistance and dust resistance of the plug 61. Moreover, when the clamping part 621 of the latch 62 is released from the opening 18, the cover 10 is easy to be removed by the first resilient element 40 pushing forward.

Figure 9:
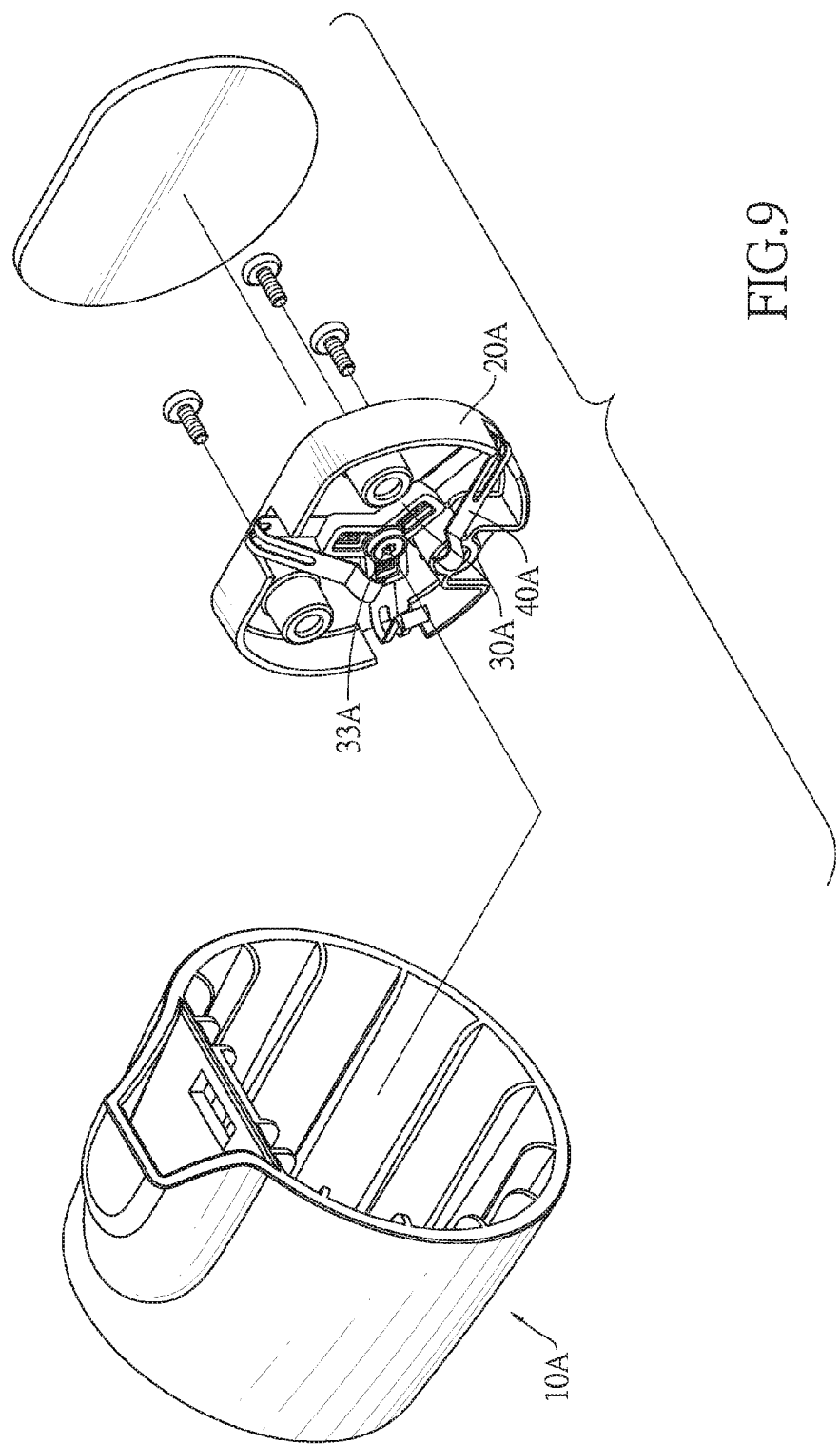
FIG. 9 is a perspective view of a second embodiment of a protecting cap structure in accordance with the present invention.
Figure 10:
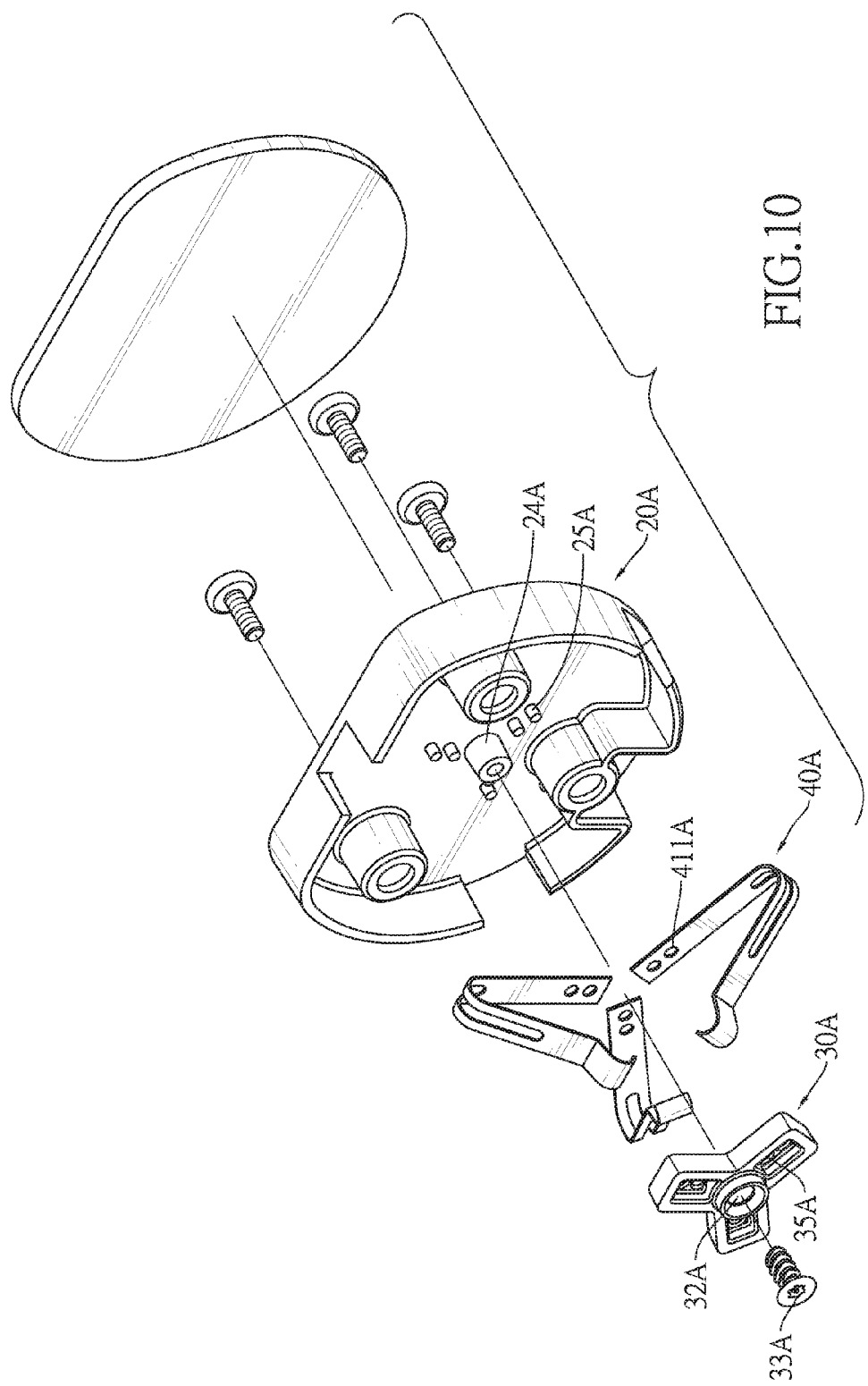
FIG. 10 is an exploded perspective view of the protecting cap structure in FIG. 9.
Figure 11:
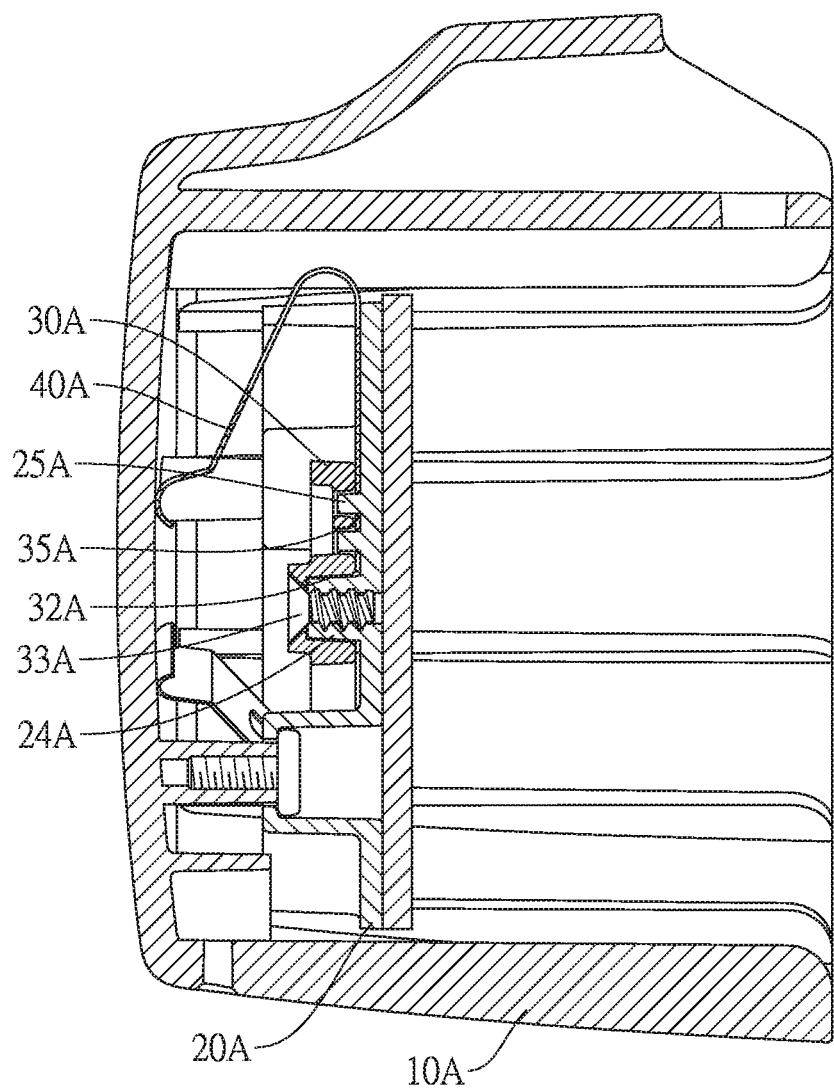
FIG. 11 is an enlarged side view in partial section of the protecting cap structure in FIG. 9.
Figure 12:
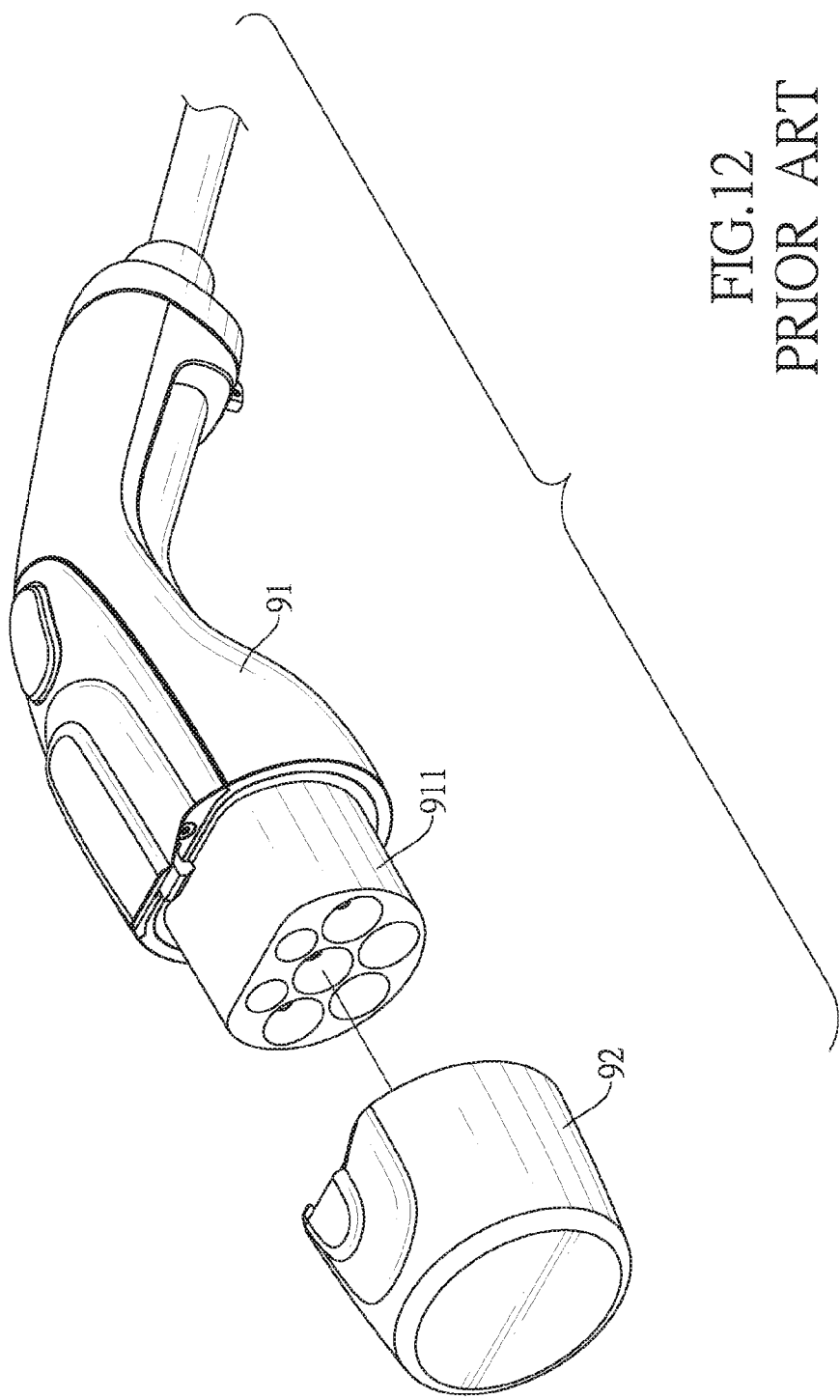
FIG. 12 is a perspective view of a protecting cap and a charging gun in accordance with the prior art.

As shown in FIGS. 9 to 11, a second embodiment of a protecting cap structure of a charging gun is substantially similar to the first embodiment as mentioned above. However, in the second embodiment, the fixing seat 30A is mounted on the push plate 20A, and the first resilient elements 40A abut the cover 10A. To be specific, one of two ends of each first resilient element 40A is connected to the fixing seat 30A, and the other end of said first resilient element 40A abuts and pushes the back side of the cover 10A.

In addition, the fourth joint 24A and the seventh joints 25A, which are formed on the back side of the cover in the first embodiment, are formed on the front side of the push plate 20A instead in the second embodiment. Preferably, in the second embodiment, the second fixing element 33A is still mounted through the third joint 32A and is screwed in the fourth joint 24A to fix the fixing seat 30A on the push plate 20A. The seventh joints 25A are still mounted through the sixth joints 411A and the fifth joints 35A.

The second embodiment also enhances both the protective function and ease in use.

What is claimed is:

1. A protecting cap structure of a charging gun, the protecting cap structure comprising:
   a cover having a front side, a back side, and a containing groove formed in the back side of the cover;
   a push plate moveably mounted in the containing groove and having a front side and a back side;
   a fixing seat mounted in the containing groove, disposed in front of the push plate, and having a front side and a back side;

at least one first resilient element mounted in the containing groove, mounted on the fixing seat, and pushing backward the push plate; and a gland mounted in the containing groove and mounted on the back side of the push plate.

2. The protecting cap structure as claimed in claim 1, wherein
the push plate has
multiple first joints formed on the push plate; and
the cover has
multiple second joints formed on the back side of the cover and connected to the first joints.

3. The protecting cap structure as claimed in claim 2, wherein
each one of the first joints is formed in the back side of the push plate, and has a stepped side wall;
the second joints are mounted in the first joints; and
multiple first fixing elements are mounted through the first joints and are screwed in the second joints; the push plate is moveably mounted around the first fixing elements, and the first fixing elements selectively abut the stepped side walls of the first joints.

4. The protecting cap structure as claimed in claim 1, wherein
the push plate has
a surrounding wall formed on the front side of the push plate and formed around a periphery of the push plate; and
the cover has
multiple ribs formed on an inner surface of the containing groove and abutting the surrounding wall.

5. The protecting cap structure as claimed in claim 4, wherein
the push plate has
a positioning groove formed in the surrounding wall; and
the cover has
a positioning part formed on the back side of the cover and disposed in the positioning groove.

6. The protecting cap structure as claimed in claim 1, wherein
the fixing seat is mounted on the cover;
the at least one first resilient element abuts the push plate; one of two ends of each one of the at least one first resilient element is connected to the fixing seat, and the other end of each one of the at least one first resilient element abuts and pushes the front side of the push plate.

7. The protecting cap structure as claimed in claim 6, wherein
the fixing seat has
a third joint; and
the cover has
a fourth joint formed on the back side of the cover and connected to the third joint.

8. The protecting cap structure as claimed in claim 7 further comprising:
a second fixing element mounted through the third joint and screwed in the fourth joint.

9. The protecting cap structure as claimed in claim 1, wherein
the fixing seat is mounted on the push plate;
the at least one first resilient element abuts the cover; one of two ends of each one of the at least one first resilient element is connected to the fixing seat, and the other end of each one of the at least one first resilient element abuts and pushes the back side of the cover.

10. The protecting cap structure as claimed in claim 9, wherein
the fixing seat has
a third joint; and
the push plate has
a fourth joint formed on the front side of the push plate and connected to the third joint.

11. The protecting cap structure as claimed in claim 10 further comprising:
a second fixing element mounted through the third joint and screwed in the fourth joint.

12. The protecting cap structure as claimed in claim 1, wherein the fixing seat has
at least one extending part protruding from a periphery of the fixing seat to connect the at least one first resilient element.

13. The protecting cap structure as claimed in claim 12, wherein each one of the at least one first resilient element has
a horizontal part having
a first end connected to a corresponding one of the at least one extending part of the fixing seat; and
a second end;
a bending part formed on the second end of the horizontal part; and
an abutting part formed on an end of the bending part.

14. The protecting cap structure as claimed in claim 13, wherein
the fixing seat is mounted on the cover;
the at least one first resilient element abuts the push plate;
the fixing seat has
multiple fifth joints formed on each one of the at least one extending part;
each one of the at least one first resilient element has
multiple sixth joints formed on the first end of the horizontal part; and
the cover has
multiple seventh joints formed on the back side of the cover and connected to the sixth joints and the fifth joints.

15. The protecting cap structure as claimed in claim 14, wherein the seventh joints of the cover are mounted through the sixth joints and the fifth joints.

16. The protecting cap structure as claimed in claim 13, wherein
the fixing seat is mounted on the push plate;
the at least one first resilient element abuts the cover;
the fixing seat has
multiple fifth joints formed on each one of the at least one extending part;
each one of the at least one first resilient element has
multiple sixth joints formed on the first end of the horizontal part; and
the push plate has
multiple seventh joints formed on the front side of the push plate and connected to the sixth joints and the fifth joints.

17. The protecting cap structure as claimed in claim 16, wherein the seventh joints of the push plate are mounted through the sixth joints and the fifth joints.

18. The protecting cap structure as claimed in claim 13, wherein each one of the at least one first resilient element has
an elongated hole formed through the bending part.

* * * * *